Jan. 25, 1966   J. P. B. BOHANNON   3,230,834
VALVE BORING AND FACING TOOL
Filed Feb. 3, 1964   3 Sheets-Sheet 1
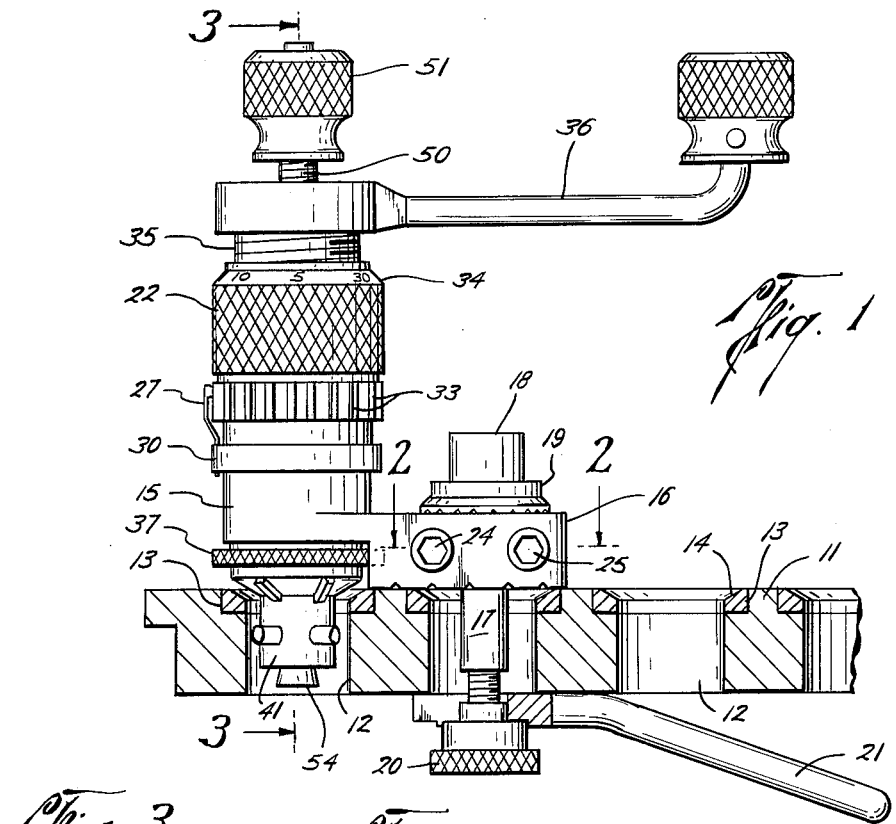
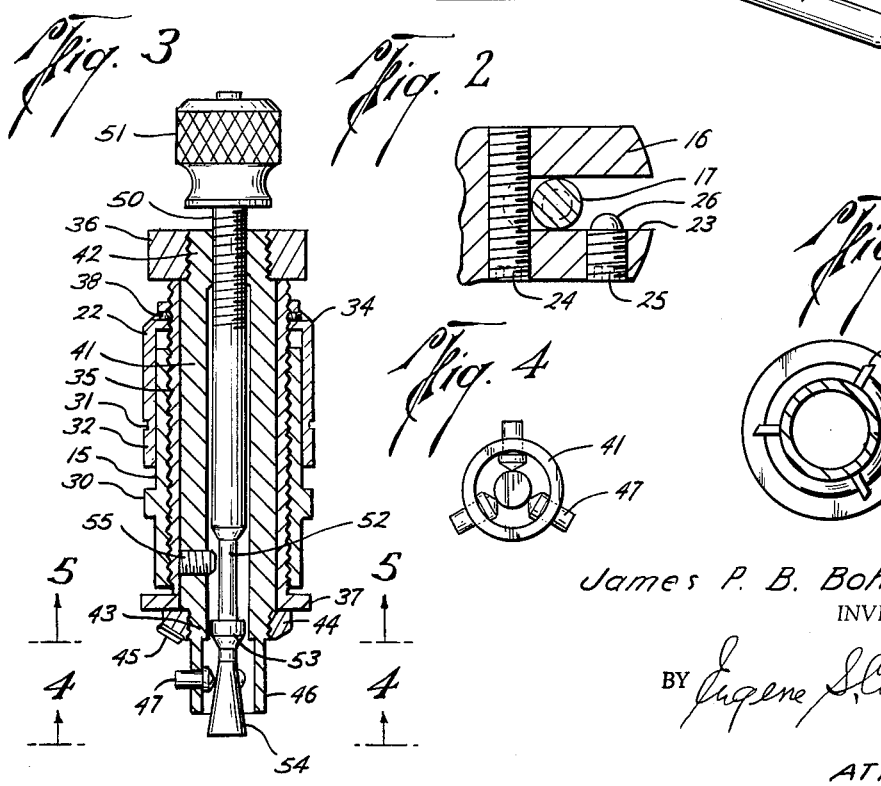
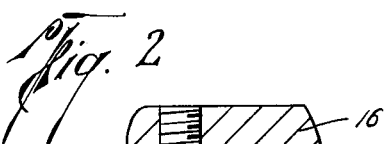
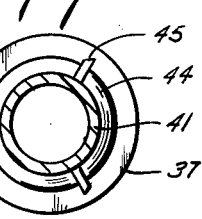
James P. B. Bohannon
INVENTOR.
BY Eugene S. Codden
ATTORNEY James P. B. Bohannon
INVENTOR.

BY Eugene S. Coddon

ATTORNEY

Jan. 25, 1966 J. P. B. BOHANNON 3,230,834
VALVE BORING AND FACING TOOL
Filed Feb. 3, 1964 3 Sheets-Sheet 3
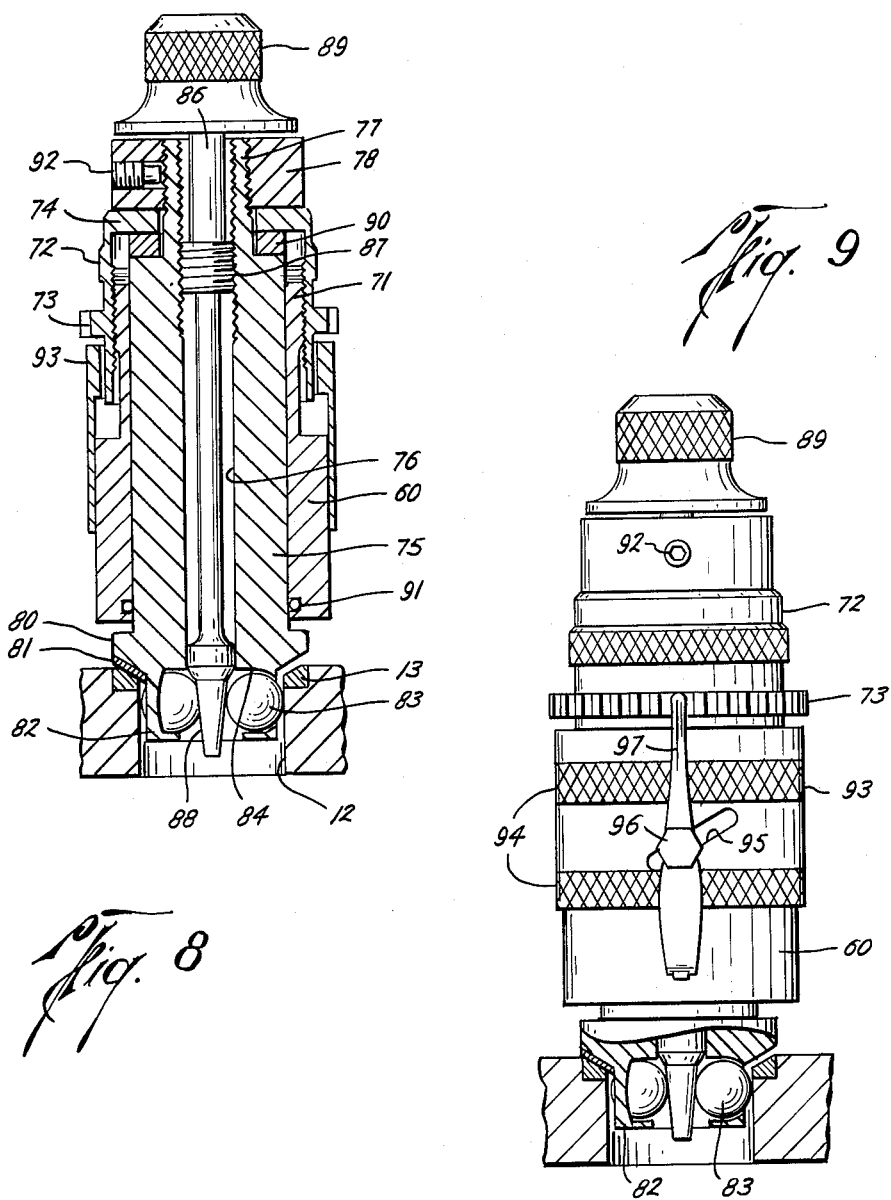
James P. B. Bohannon
INVENTOR.
BY *Eugene S. Clodden*
ATTORNEY United States Patent Office 3,230,834
Patented Jan. 25, 1966

3,230,834
VALVE BORING AND FACING TOOL
James P. B. Bohannon, Greensburg, Ky., assignor to Tennessee Gas Transmission Company, Houston, Tex., a corporation of Delaware
Filed Feb. 3, 1964, Ser. No. 342,162
4 Claims. (Cl. 90—12.5)

This invention relates to an apparatus for use in boring or facing a valve seat. More particularly, this invention relates to an improved apparatus for boring or facing valve seats in a valve seat holder in which there are a plurality of valve openings laterally spaced apart therein and in the same general plane. For purposes of convenience, the term "facing" will be used to describe operations where the valve face is merely scraped clean and also where a substantial portion of the valve seat is removed whereby a new seat insert may be inserted in the valve opening.

There has long been a need for a tool that was quickly and easily adaptable for use in grinding valve seats in a valve seat holder having a plurality of laterally spaced apart valve openings. The present invention provides a tool which may be locked in one valve opening to thereby positively secure the tool in relation to the valve seat which is to be faced. This novel aspect of the tool allows the use of a very small and portable tool which is easily operated by relatively unskilled operators. This invention provides self alining means and is adaptable to a plurality of sizes and types of poppet valve seats.

The prior art is prolix with various types of tools for grinding or facing valve seats wherein the tool is secured to the framework surrounding the valve. However, none of the prior art structures are so constructed that while one valve seat is being faced, the tool is supported by a portion thereof extending into and secured to the opening of another valve seat. None of the prior art teaches the use of extendable centering or positioning means which may be extended to thereby center the cutting edges of the tool, and which may thereafter be withdrawn from engagement during the actual cutting operation. Various tools of the prior art have taught various means for advancing the cutting edges, but none have provided micrometer means for gaging the depth to which the valve seat is faced nor means for cutting a plurality of valve seats to the same depth.

It is therefore an object of this invention to provide an improved valve seat facing tool having a lateral extension with adjustable locking means for insertion into and locking in a valve opening laterally spaced apart from the valve seat to be faced.

It is another object of this invention to provide an improved tool for attaching in a valve opening in a valve holder having a plurality of said valve holes and having rotatable cutting means for facing a valve seat in a valve opening adjacent to that valve opening in which the tool is secured.

It is a further object of this invention to provide an improved valve facing tool having extendable means for centering the cutter means of the tool in relation to the valve seat, which extendable means are adapted to be disengaged during the actual cutting operation.

These and other objects of this invention will be obvious to those skilled in the art by reference to the description herein and the drawings which form a part of the specification.

Briefly stated, the invention herein taught relates to a tool for facing or grinding valve seats in a valve seat holder having a plurality of valve openings therein, which openings are laterally spaced apart from each other but are in the same general plane. The tool has an outer body with a cylindrical opening therethrough. The outer body is so constructed that the cylindrical opening may be placed perpendicularly over the valve seat to be faced.

The outer body is provided with a lateral extension which is of sufficient length to extend over an adjacent valve opening. Means are provided for fixedly securing this extension to the adjacent valve opening. In the preferred form, this extension is adjustable to compensate for variations in space between each of the pairs of valve openings.

An inner tubular member is rotatably mounted inside the cylindrical opening in the outer body and extends downwardly therefrom and into the valve opening on which the facing operation is to be performed.

Means are provided on the tool for rotating and advancing the inner tube downward relative to the outer body.

A centering shaft is positioned inside of the inner tube and extends out the upper end thereof where it can conveniently be manipulated. This centering shaft has a tapered lower portion forming a camming surface, which surface is adapted to engage and extend radially outward a plurality of extendable centering lugs or means housed in the lower end of inner tube, whereby the inner tube may be centered in relation to the valve opening.

A cutting means in the form of blades, scrapers, reamers or the like are attached near the lower end of said inner tube and adapted to engage the face of the valve seat being faced. When the tool is so secured, the centering lugs may be disengaged and cutting operations started by effecting rotation of the inner tube and advancing it downwardly.

Reference to the drawings will further explain the invention wherein like numerals refer to like parts and in which:

FIG. 1 is a side elevation view partially in cross section showing one embodiment of the invention as it is mounted in a valve seat holder and ready to perform the valve facing operation.

FIG. 2 is a cross sectional view taken at line 2—2 of FIG. 1.

FIG. 3 is a central vertical sectional view taken at line 3—3 of FIG. 1.

FIG. 4 is a cross sectional view taken at line 4—4 of FIG. 3.

FIG. 5 is a cross sectional view taken at line 5—5 of FIG. 3.

FIG. 8 is a central vertical sectional view taken at line 8—8 of FIG. 6.

FIG. 9 is a side elevation view of the apparatus shown in FIG. 6 as that apparatus would be viewed from the left side as seen in FIG. 6.

Figure 6:
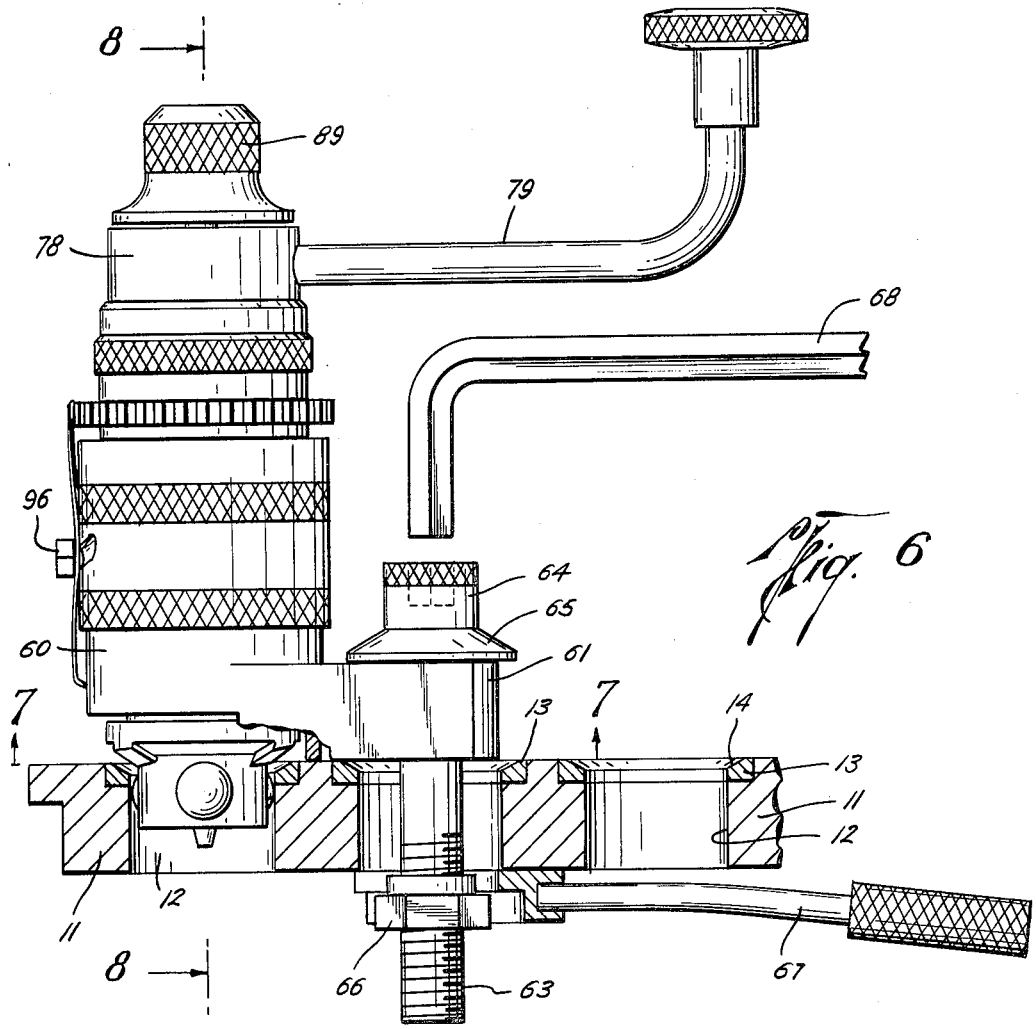
FIG. 6 is a view similar to FIG. 1 but showing another embodiment of the invention.

Referring now to FIG. 1, one embodiment of the invention will be described in detail. Since the apparatus is primarily useful in facing valve seats in a valve seat holder having a plurality of valve openings therein, the apparatus in question is shown as it would be mounted in valve seat holder 11 which has a plurality of valve openings 12 therein, each of which is provided with an annular valve seat insert 13, the upper surface of which forms valve seat 14.

The tool has an annular outer body 15 with a lateral extension 16 attached thereto, which extension is of sufficient length to reach over an adjacent valve opening. It will be observed the valve openings 12 are laterally adjacent to each other and in the same general plane. Hence, when the tool is positioned over one opening it may be locked to an adjacent valve opening by locking means connected to extension 11.

Extension 16 is provided with a U-shaped opening 23 in which locking pin 17 is positioned and held by a horizontal Allen screw 24 which passes horizontally through extension 16 and a second Allen screw 25 which is provided with a spring loaded detent ball 26 which projects into opening 23.

Locking pin 17, which extends through the valve opening is provided with a locking pin head 18 at its upper end which fits over and secures annular hold down washer 19 which has a knurled under surface for frictionally engaging the top portion of extension 16. Locking pin 17 is provided with internal threads on its lower end into which locking nut 20 is designed to threadably engage. Thus, by turning on locking nut 20, extension 16 may be securely locked in relation to the valve opening. To assist in this locking operation, locking nut 20 is designed to accommodate locking wrench 21 thereabout, so that by turning on locking wrench 21, nut 20 can be more securely locked in position.

As shown in FIG. 1, the main body portion of the apparatus and more particularly outer body 15 is positioned in a perpendicular position over and above a valve opening. Surrounding the upper portion of outer body 15 is an external tube 22, the details of which can best be seen in FIG. 3. There it will be observed that outer body 15 has an enlarged annular portion thereabout forming ring 30. External tube 22 surrounds outer body 15 and is positioned above ring 30. External tube 22 is provided with an annular recess 31 toward the lower end thereof which sets off an annular dial portion 32 which is provided with a plurality of vertical grooves 33 thereabout.

The upper part of external tube 22 is knurled for gripping purposes and is provided with numbers on reduced portion 34 which tapers radially inwardly. Reduced portion 34 is provided with an annular opening having threads thereabout which mateably engage threads on middle tube 35. Middle tube 35 projects upwardly from reduced portion 34 and provides a rest for turning handle 36 positioned thereabove. Middle tube 35 also extends downwardly through outer body 15 and has external threads which engage internal threads provided in outer body 15. The lower end of middle tube 35 is provided with an enlarged annular portion forming lower ring 37 having a knurled external surface. External tube 22 is secured to middle tube 35 for rotation therewith by set screws 38 which pass through reduced portion 34.

Middle tube 35 has a smooth cylindrical bore therethrough in which inner tube 41 is positioned for rotation therein. Inner tube 41 extends upwardly from the top portion of middle tube 35 and has a reduced threaded portion 42 to which handle 36 is threadably secured thereabout.

Inner tube 41 also extends downwardly from the lower end of middle tube 35 and has a reduced threaded portion 43 to which is secured an annular cutter mounting 44, which mounting forms an upwardly facing shoulder which engages the downwardly facing shoulder formed by lower ring 37. Cutter mounting 44 is provided with one or more cutters 45, which cutters are adapted to engage the valve seat as will be explained hereinafter.

Inner tube 41 also has a tubular portion extending below threaded portion 43, which forms lug housing 46. Housing 46 is provided with a plurality of cylindrical shaped lugs 47 which are adapted for radial movement in housing 46, the purpose of which will be explained hereinafter.

Inner tube 41 has an axial annular opening therethrough with the upper portion of said opening being provided with threads which engage threads on shaft 50 which passes entirely through inner tube 41. The top portion of shaft 50 is provided with knurled knob 51 which is adapted for gripping and turning with the hand. The lower end of shaft 50 is provided with reduced portion 52 having an enlarged portion 53 therebelow and a tapered portion 54 below that, which tapered portion forms a camming surface as will now be explained. By turning on knurled knob 51, shaft 50 is rotated thereby and caused to move axially up and down with respect to inner tube 41. Hence when shaft 50 is moved upwardly tapered portion 54 will cam lugs 47 radially outward. Lugs 47 are of such length as to engage the internal surface of valve opening 12 upon being cammed outwardly. By having a plurality of lugs 47, and preferably three, inner tube 41 is thereby centrally positioned in and over the valve opening on which the work operation is to be performed.

Inner tube 41 is also provided with limit screw 55 which projects into the opening formed by reduced portion 52 of shaft 50. Hence the movement of shaft 50 is limited by the length of reduced portion 52.

In operation of the tool, outer body 15 with its cylindrical opening therethrough would be placed perpendicularly over a valve opening 12 as shown in FIG. 1. Extension 16 would be positioned over an adjacent valve opening 12 with locking pin 17 being positioned inside of that valve opening. Locking nut 20 would be engaged in locking pin 17 and tightened sufficiently to take up slack but not sufficiently to create locking. At this point the operator turns knurled knob 51 such that shaft 50 will be rotated and moved upward. In so doing, tapered portion 54 of shaft 50 cams lugs 47 radially outward, thereby centrally positioning inner tube 41, cutter mounting 44, and associated elements in relation to the valve seat to be faced. With the tool so positioned locking nut 20 would then be locked into position by turning locking wrench 21. With the tool so positioned and locked, knurled knob 51 would again be turned so that shaft 50 is rotated and moved downwardly, thus disengaging lugs 47. At this point the grinding operation is ready to be started.

Since external tube 22 is secured to middle tube 35, as explained above, the operator can advance inner tube 35 downwardly by turning on external tube 22. This then provides the means by which the cutters 45 may be advanced into cutting engagement with a valve seat insert 13. It is to be understood that cutter 45 may be either designed to dress or face the valve seat or to ream the valve seat insert. The numbers provided on reduced portion 34 of external tube 22 perform a micrometer function in that the operator can advance the cutter means a prescribed distance by the proper turning of external tube 22. In addition, a resilient dial arm 27 has the bottom portion thereof secured to ring 30 and the top portion resiliently engaging grooves 33 of dial portion 32. This aids in determining the depth to which the valve is ground or faced.

With the cutters 45 in drilling engagement or cutting engagement with valve seat 13, the facing operation can be accomplished by turning on turning handle 36 which, of course, rotates cutters 45. When the desired amount of cutting or facing has been accomplished, the tool may be disassembled by loosening locking nut 20 by turning on locking wrench 21. The operation can then be repeated on another valve seat.

It will thus be seen that the art has been provided with a novel valve seat facing tool which is of simple construction, which is easily operable, and which is adapted for use on a valve seat holder having a plurality of valve openings, which openings are spaced laterally adjacent to each other and in the same general plane. The centralizing means formed by lug housing 46 and lugs 47 are so constructed that they are disengaged during operation of the tool and do not interfere with the grinding operation. There are, of course, many alternatives which are available with this invention.

Figure 7:
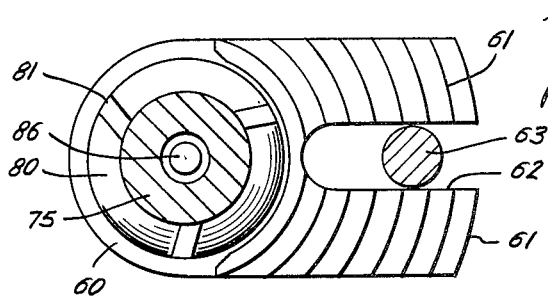
FIG. 7 is a sectional view taken at line 7—7 of FIG. 6.

For example, FIG. 6 shows another embodiment of the invention, having an outer body 60 with a lateral extension 61 attached thereto and extending over an adjacent valve opening. Extension 61, as best seen in FIG. 7, is likewise provided with a U-slot 62 which is adapted for reception of locking pin 63 therethrough, which pin is provided with pinhead 64 which fits over annular hold down washer 65. Locking pin 63 is held in position by locking nut 66 and is adapted for use with locking wrench 67, which is shaped to fit locking nut 66, whereby nut 66 may be operated thereby. This locking operation is accomplished by manipulation of locking wrench 67 and Allen wrench 68 which is adapted for insertion into pinhead 64.

Referring now to FIG. 8, the details of the body portion of the apparatus will be explained in greater detail. There it will be seen that outer body 60 has a reduced upper portion 71 which is tubular in shape and is provided with external threads around the upper end thereof which are threadably engaged with internal threads which are provided on external tube 72. External tube 72 is provided with an enlarged annular portion thereabout forming dial ring 73 having a plurality of vertical notches thereabout. External tube 72 is formed at the top with a radially inwardly extending flange 74 having an annular opening therethrough. Positioned inside of outer body 60 and extending therethrough is an elongated cylindrical inner tube 75 having a cylindrical axial opening 76 therethrough. The top portion of inner tube 75 is provided with a reduced portion 77 having both external and internal threads. The external threads engage with hub 78 of turning handle 79. The lower portion of inner tube 75 is provided with an enlarged portion forming annular cutter mounting 80 to which cutters 81 are attached so as to engage the seat of valve seat insert 13. The lower end 82 of inner tube 75 is reduced so as to admit of insertion into valve opening 12. Lower end 82 is so constructed as to provide a housing for three centering balls 83 which are adapted to move radially inward and outward in ball recesses 84 provided in lower end 82.

Axial opening 76 of inner tube 75 is provided with threads at the upper end. Shaft 86 passes down through axial opening 76 and has an enlarged threaded portion 87 which engages the threaded portion of inner tube 75. The lower end of shaft 86 is provided with a tapered portion 88 which is adapted to force balls 83 radially outward when shaft 86 is moved downwardly by turning on knurled knob 89 attached to the top of shaft 86. Between flange 74 and the upper portion of inner tube 75 there is provided an annular washer 90 to reduce the friction between the separated elements during operation of the tool.

An O-ring 91 is provided on the inside of outer body 60 and near the lower end thereof for the purpose of retaining lubricating fluids in the tool. Hub 78 of turning handle 79 is threaded onto reduced portion 77 and is held there by a set screw 92.

The tool is also provided with an external depth gage sleeve 93, the upper portion of which surrounds the lower portion of external tube 72 and the bottom part surrounds outer body 60. Sleeve 73 has two annular knurled rings 94 thereabout to facilitate grasping and turning, as best seen in FIG. 9. Sleeve 93 is also provided with a circumferential slot 95 through which sleeve bolt 96 passes for attachment to outer body 60. Sleeve bolt 96 also passes through a resilient dial arm 97, the bottom end of which is shaped for clipping into a small opening in outer body 60 and the top end of which engages the notches in dial ring 73. Thus, by loosening sleeve bolt 96, sleeve 93 may be rotated whereby it is moved axially either up or down relative to outer body 60. The top edge of sleeve 93 forms an abutment against which dial ring 73 abuts as external tube 72 is screwed downwardly on outer body 60.

In operation the tool would be positioned as generally shown in FIG. 6 with locking pin 63 held loosely in the valve opening. Shaft 86 would be rotated so as to move tapered portion 88 downward, thereby forcing centering balls 83 radially outward, thus centrally positioning cutter mounting 80 with respect to the valve seat to be dressed. At this point the locking pin would be locked into the adjacent valve opening by manipulating Allen wrench 68 and locking wrench 67. With the tool thus secured, knurled knob 89 would be rotated in the opposite direction, thus permitting centering balls 83 to move out of contact with the valve opening. Then by turning handle 79, inner tube 75, annular cutter mounting 80 and cutters 81 would be rotated. By then turning on external tube 72, washer 90 and inner tube 75 would be forced downwardly with cutters 81 thus engaging valve seat insert 13, where facing can then be accomplished by turning handle 79. The downward movement of inner tube 75 may be continued until dial ring 73 engages the top edge of sleeve 93. Thus it is possible to adjust sleeve 93 such that cutter 81 will cut to the desired depth and no more. This adjustable feature permits all the valve seats to be ground to the same uniform depth. In addition, the operation of dial arm 97 and dial ring 73 act as a micrometer, thus permitting the operator to carefully control the cutting operation.

Other modifications may be made in the invention, as particularly described, without departing from the scope of the invention. Accordingly, the foregoing description is to be construed illustratively only and is not to be construed as a limitation upon the invention as defined in the following claims.

What is claimed is:

1. An apparatus for facing valve seats in a valve seat holder, wherein said holder has a plurality of valve openings therein, which openings are laterally spaced apart from each other and in the same general plane, said apparatus comprising:
   an outer body member having a cylindrical opening therethrough for mounting perpendicularly over one of said valve seats to be faced,
   a lateral extension attached to said outer body and having adjustable locking means to compensate for varying distances between said valve openings and for passing down through and securing to a valve opening adjacent to that valve opening over which said cylindrical opening is mounted, whereby said outer body may be locked in a stationary position relative to said valve seat holder,
   an inner tubular member rotatably mounted inside of said cylindrical opening in said outer body and extending downwardly therefrom,
   threaded tubular means for advancing said inner tubular member downward relative to said outer body,
   a handle connected to the upper end of said inner tubular member for rotating said inner tubular member relative to said outer body,
   a centering shaft extending axially down through said inner tubular member and into said valve opening over which said outer body is held and having a tapered portion near the lower end thereof forming a camming surface,
   a plurality of extendable centering members housed in the lower end of said inner tubular member and adapted to be cammed outwardly by said camming surface of said centering shaft, and
   cutter means attached near the lower end of said inner tubular member, the cutting surface of which is adapted to engage and face said valve seat when said inner tubular member is advanced downwardly and rotated.

2. The apparatus as claimed in claim 1 wherein said threaded tubular means for advancing said inner tubular member downward relative to said outer body includes:
   an intermediate tube between said inner tubular member and said outer body and having external threads adapted to engage internal threads provided on the surface of said outer body forming said cylindrical opening, and an external tube surrounding the upper portion of said outer body and secured to the upper portion of said intermediate tube for axial movement therewith.

3. The apparatus as claimed in claim 1 wherein said threaded tubular means for advancing said inner tubular member downward relative to said outer body includes:

an external tubular member having an internally threaded portion adapted to surround and engage external threads provided on the upper portion of said outer body member, and having an inwardly extending flange engaging a shoulder near the upper end of said inner tubular member, whereby said inner tubular member is forced axially upward and downward by turning on said external tubular member.

4. The apparatus as claimed in claim 3 wherein:

said external tubular member is provided with an enlarged circumferential portion forming a downwardly facing shoulder, and having a depth gage sleeve surrounding a portion of said outer body and the lower portion of said external tubular member, which sleeve is adapted to abut with said downwardly facing shoulder when said inner tubular member is advanced downward a predetermined distance, and means for adjustably securing said sleeve to said outer body and for axially moving said sleeve relative to said inner tubular member.

References Cited by the Examiner
UNITED STATES PATENTS

| | | | |
|---|---|---|---|
| 1,186,403 | 6/1916 | Johnsen | 77—2 |
| 1,748,126 | 2/1930 | Hall | 90—12.5 X |
| 2,009,822 | 7/1935 | Thorsen | 77—2 |
| 2,232,340 | 2/1941 | Olson | 90—12.5 X |
| 2,267,837 | 12/1941 | Petersen | 77—2 |
| 2,283,323 | 5/1942 | Erhardt | 90—12.5 |
| 2,811,903 | 11/1957 | Harmes | 77—2 |

WILLIAM W. DYER, JR., *Primary Examiner.*

G. A. DOST, *Assistant Examiner.*